3,111,380
PREPARATION OF METAL OXYCHLORIDES
Harry Braus, Springdale, and Howard J. Cohen, Golf Manor, Ohio, assignors to National Distillers and Chemical Corporation, New York, N.Y., a corporation of Virginia
No Drawing. Filed June 9, 1960, Ser. No. 34,859
10 Claims. (Cl. 23—85)

This invention relates to a new and improved method for the preparation of metal oxyhalides and, more specifically, to the formation of metal oxychlorides. The invention also pertains to a method for the preparation of an anhydrous mixture containing metal oxychlorides and titanium tetrachloride.

In recent years there have been many proposals dealing with the use of various metal oxyhalides, and particularly the oxychlorides, as polymerization catalysts or components thereof. Prior art methods for preparing these compounds have the disadvantage of requiring elaborate purification treatments to remove undesirable by-products such as oxygen-containing compounds and water. Since catalyst cost is an important factor in most commercial polymerization processes, considerable effort has been expended on developing improved catalysts preparations.

One object of this invention is to provide a method for the preparation of metal oxyhalides which avoids the difficulties encountered in the prior art processes. Another object of the invention is to provide a direct method for preparing the metal oxychlorides in an anhydrous medium. A further object of this invention is to provide a method for the preparation of a catalyst system comprising a metal oxychloride and titanium tetrachloride. Other objects will become apparent from the ensuing description of the invention.

These and other objects of the invention are accomplished by reacting titanium tetrachloride with a metal oxide to form the corresponding metal oxychloride. In accordance with the preferred method of operation, the oxychlorides of such metals as vanadium, chromium, and molybdenum are readily prepared in outstanding yields. The corresponding metal oxides, which are employed as starting materials, are selected from any of the commercially available forms. Although the oxide with the metal component at its highest state of valency is usually the most common form, it will be understood that lower oxides of the aforementioned metals can also be effectively employed in the method of this invention. It is also preferred to use granulated or particulated metal oxides to facilitate the reaction. Illustrative metal oxide starting materials are as follows:

| | | |
|---|---|---|
| $V_2O_5$ | $Mo_2O_3$ | $V_2O_4$ |
| $CrO_3$ | $MoO_2$ | $V_2O_2$ |
| $MoO_3$ | $V_2O_3$ | $Cr_2O_3$ |

The titanium tetrachloride reactant may be used in either gaseous or liquid form, although the use of the latter is preferred. It is also advisable to employ as pure a titanium tetrachloride as possible in order to avoid contamination of the metal oxychloride product. It will be understood, however, that commercial grade titanium tetrachloride can be employed in the inventive method. In general, the amount of titanium tetrachloride used will at least be sufficient to react with all of the metal oxide, i.e. the reaction can be carried out with at least stoichiometric amounts of the titanium tetrachloride. Another aspect of the invention, which will be described more fully below, involves the use of excess amounts of titanium tetrachloride. By operating in this manner, a mixture of titanium tetrachloride and the particular metal oxychloride formed in the reaction is recovered from the reaction product mixture by distillation or volatilization or the like. These mixtures are valuable catalysts systems which can be directly employed in various polymerization reactions including the polymerization of olefins such as ethylene.

Conventional reactor and recovery equipment may be employed in carrying out the method of this invention. In general, the titanium tetrachloride and the metal oxide feed are heated at elevated temperatures under reflux conditions for a period of time sufficient to complete the reaction. The temperatures employed may range from about $-30°$ to $200°$ C., and preferably will be from about $100°$ to $150°$ C. The reaction time period will generally range from about 1 to 8 hours, although it is only necessary to continue the reaction until substantially all of the metal oxide has been reacted. It is also preferred to carry out the reaction under an inert atmosphere. One of the easiest ways of fulfilling this condition would be to conduct the reaction in the presence of inert gases such as nitrogen, argon, helium, mixtures thereof, and the like. Nevertheless, the use of an inert gas is not considered to be an essential feature of this invention.

Upon the completion of the reaction, the metal oxychloride product is separated from the reaction product mixture. Conventional techniques such as distillation, vaporization, filtration, sublimation, and the like may be employed to effect the necessary separation. If no titanium tetrachloride is present in the product mixture, the metal oxychloride may be separated from metal oxide contaminants by filtration, vaporization, or sublimation. In general, excess titanium tetrachloride is employed in the reaction and a one or two phase reaction product results. One phase contains the metal oxide by-product, and any unreacted metal oxide feed material is insoluble and can be readily removed by filtration. The other phase contains the unreacted titanium tetrachloride and the metal oxychloride is liquid. However, the metal oxychloride and metal oxide may be in the same phase and the excess titanium tetrachloride is removed. Following separation of the insoluble phase, the mixture of titanium tetrachloride and metal oxychloride may be subjected to close fractionation or sublimation to recover the metal oxychloride, if desired. If the metal oxychloride is in the insoluble phase, then fractionation at elevated temperatures is necessary. As previously pointed out, the liquid phase comprising the titanium tetrachloride and the metal oxychloride may be used as such as a low pressure, Ziegler-type catalyst system for the polymerization of ethylene. This particular product is ideally suited for olefin polymerization in that it is completely anhydrous and thereby eliminates one of the primary contaminators in polymerization catalysts. This is an important advantage over prior art processes, e.g. the chlorination of metal oxides with hydrogen chloride, wherein the products had to be subjected to expensive and time consuming drying operations.

The over-all reactions which take place during the practice of this invention are illustrated below:

$$3TiCl_4 + 2V_2O_5 \rightarrow 4VOCl_3 + 3TiO_2 \quad \text{(Eq. 1)}$$
$$TiCl_4 + 2CrO_3 \rightarrow 2CrO_2Cl_2 + TiO_2 \quad \text{(Eq. 2)}$$
$$TiCl_4 + 2MoO_3 \rightarrow 2MoO_2Cl_2 + TiO_2 \quad \text{(Eq. 3)}$$

It is believed, however, that the actual reaction mechanism is more complicated than indicated by the over-all reactions set forth above. The formation of unstable titanium oxychloride as an intermediate is believed to take place as follows:

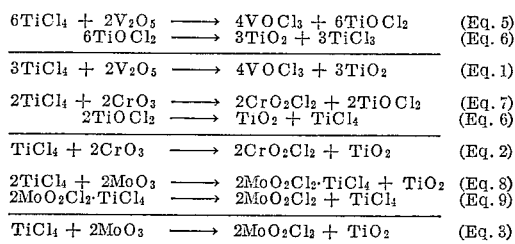

The invention is further explained by the following examples which are intended for purposes of illustration and not of limitation.

*Example I*

Vanadium pentoxide (0.1 M) and TiCl₄ (0.15 M) were placed in a 3-necked flask equipped with reflux condenser, stirrer, thermometer and nitrogen inlet. The mixture was heated to reflux at 105°–130° C. for 6 hours under a blanket of nitrogen. The contents were then distilled yielding a mixture of $VOCl_3$ and $TiCl_4$. The yield of $VOCl_3$ based on $V_2O_5$ was 65% by weight.

*Example II*

Chromium trioxide (0.10 M) and TiCl₄ (0.10 M) were reacted as in Example I. The distillation yielded a dark red fuming liquid, $CrO_2Cl_2$, which was collected at 122° C. The product was contaminated with some $TiCl_4$, which was removed by fractionation. The yield of $CrO_2Cl_2$ based on $CrO_3$ was 88% by weight.

*Example III*

Molybdenum oxide (0.3 M) and titanium tetrachloride (0.6 M) were placed in a three-necked flask provided with a Vigreux column, Lew stirrer, nitrogen inlet and receiver. The mixture was heated to reflux temperature and maintained at that temperature for about 1 hour before distilling off a red distillate (106.5 g.). When this distillate was further heated, the first sublimate recovered (11.5 g.) over a period of several hours analyzed 42.1% Mo, 2.4% Ti, and 40.22% Cl, which is equivalent to about 9.6% TiCl₄ in the mixed salt $Mo_2Cl_2 \cdot TiCl_4$. A second sublimate (1.0 g.) was then recovered and analyzed 47.2% Mo, 34.46% Cl and 0% Ti. The theoretical analysis for $MoO_2Cl_2$ is 48.25% Mo and 35.66% Cl.

The above data show that the method of this invention can be effectively employed to produce various metal oxychlorides in outstanding yields. In addition, the foregoing examples demonstate that the reaction as well as the recovery of the desired products can take place in a completely anhydrous medium. The recovery of the metal oxychloride itself or mixtures thereof with titanium tetrachloride is also shown.

In some instances the metal is capable of existing in more than one form of oxychloride, and it is within the scope of this invention to prepare the desired form of the metal oxychloride. This may be accomplished, for example, by coordinating the selection of the metal oxide feed with the reaction conditions, e.g. temperature, and the recovery procedure.

While the invention has been described above in respect to more or less specific embodiments thereof, it will be understood that it is capable of obvious variations without departing from its broader aspects. For example, metal oxides other than those specifically listed above may be employed as the feed material. It is, therefore, within the scope of this invention to utilize oxides of metals from groups IV, V and VI of the periodic chart such as columbium, zirconium, hafnium, tantalum, tungsten, uranium, and the like. It is also possible to operate the method of this invention with varying amounts of titanium tetrachloride ranging from stoichiometric amounts to large excesses. In this manner it is possible to recover the metal oxychloride or admixtures thereof with minor or major proportions of titanium tetrachloride. The method of this invention may be carried out either in batch or continuous operations, under atmospheric or elevated pressures, and with recycling of unreacted metal oxide and titanium tetrachloride.

What is claimed is:

1. A method for the preparation of metal oxychlorides which comprises reacting at least a stoichiometric amount of titanium tetrachloride with a metal oxide, said metal being selected from the group consisting of vanadium, chromium, and molybdenum, at a temperature within the range of about −30° to 200° C., and recovering the resulting metal oxychlorides.

2. The method of claim 1 wherein said reacting is carried out at a temperature within the range of about 100° to 150° C.

3. The method of claim 1 wherein said reaction is carried out in the presence of inert gas.

4. The method of claim 1 wherein said metal is vanadium.

5. The method of claim 1 wherein said metal is chromium.

6. The method of claim 1 wherein said metal is molybdenum.

7. The method of claim 1 wherein an excess of titanium tetrachloride is employed and a mixture of the metal oxychloride and titanium tetrachloride is recovered.

8. The method of claim 7 wherein said metal is vanadium.

9. The method of claim 7 wherein said metal is chromium.

10. The method of claim 7 wherein said metal is molybdenum.

References Cited in the file of this patent

UNITED STATES PATENTS

| | | |
|---|---|---|
| 2,567,419 | Bengston | Sept. 11, 1951 |
| 2,703,752 | Glasser et al. | Mar. 8, 1955 |
| 2,754,255 | Stambaugh | July 10, 1956 |
| 2,867,501 | Hanley | Jan. 6, 1959 |

OTHER REFERENCES

Voronkov et al.: Chem. Abstracts, vol. 52, No. 20, page 17093 (October 25, 1958).